Jan. 21, 1969 T. S. DZIANOTT 3,422,805
ENGINE INLET PASSAGE SWIRL DEVICE
Filed Nov. 16, 1966 Sheet 1 of 3
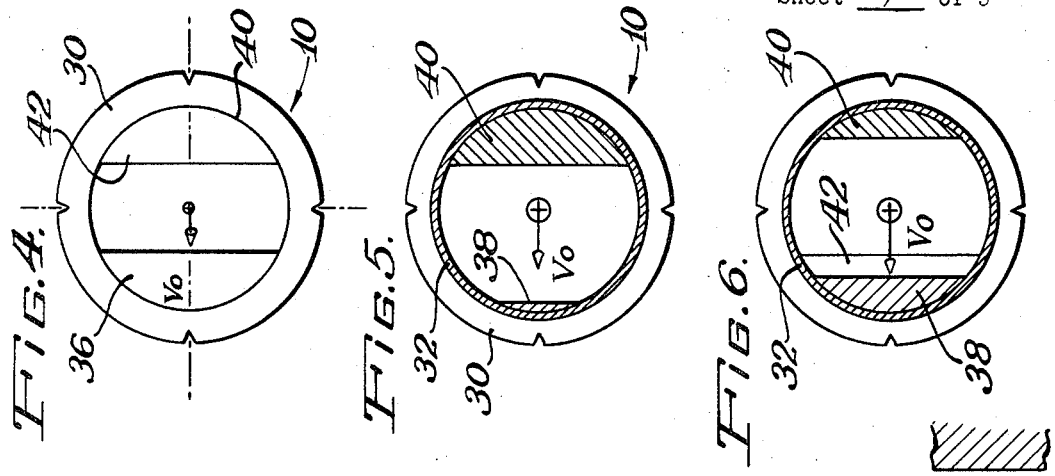
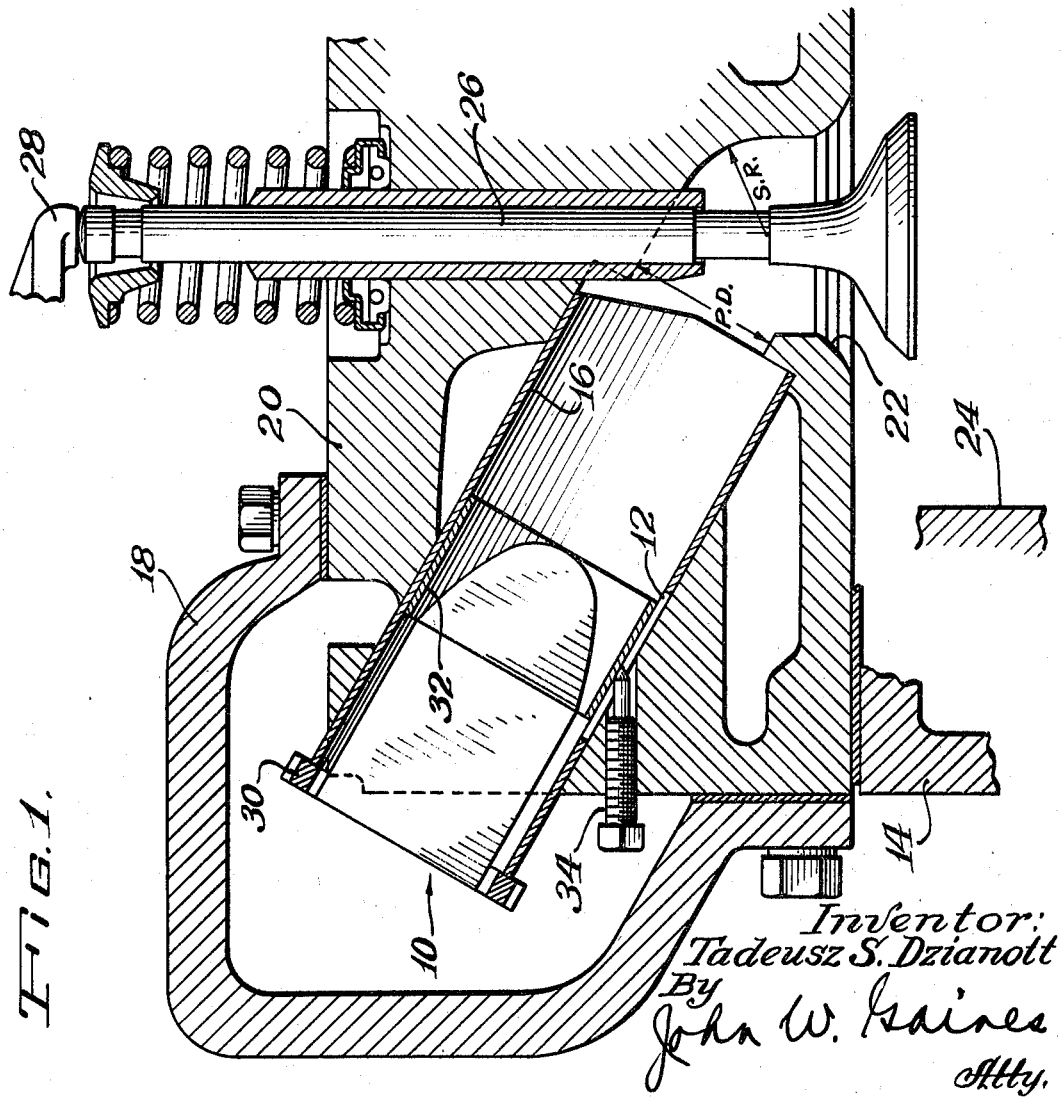
Inventor:
Tadeusz S. Dzianott
By John W. Gaines
Atty.

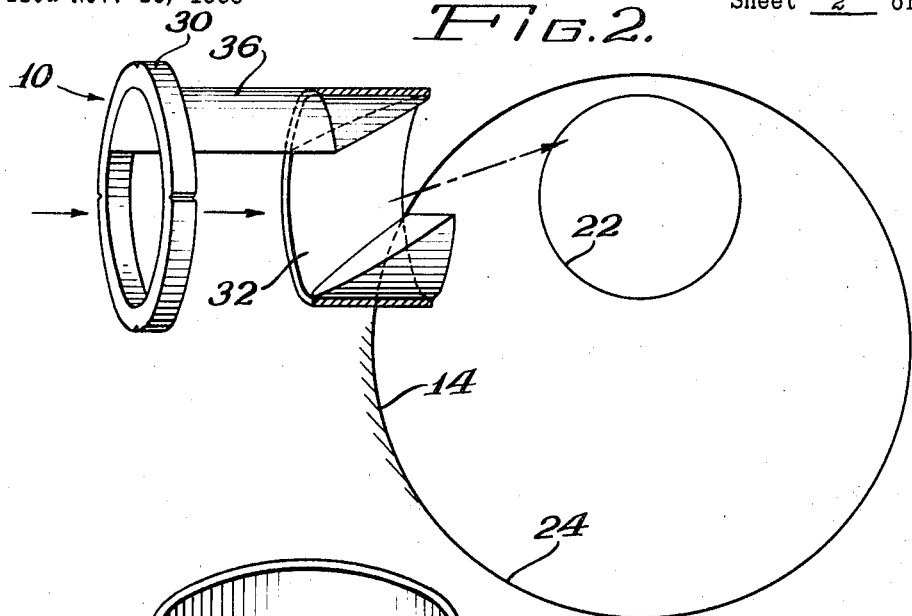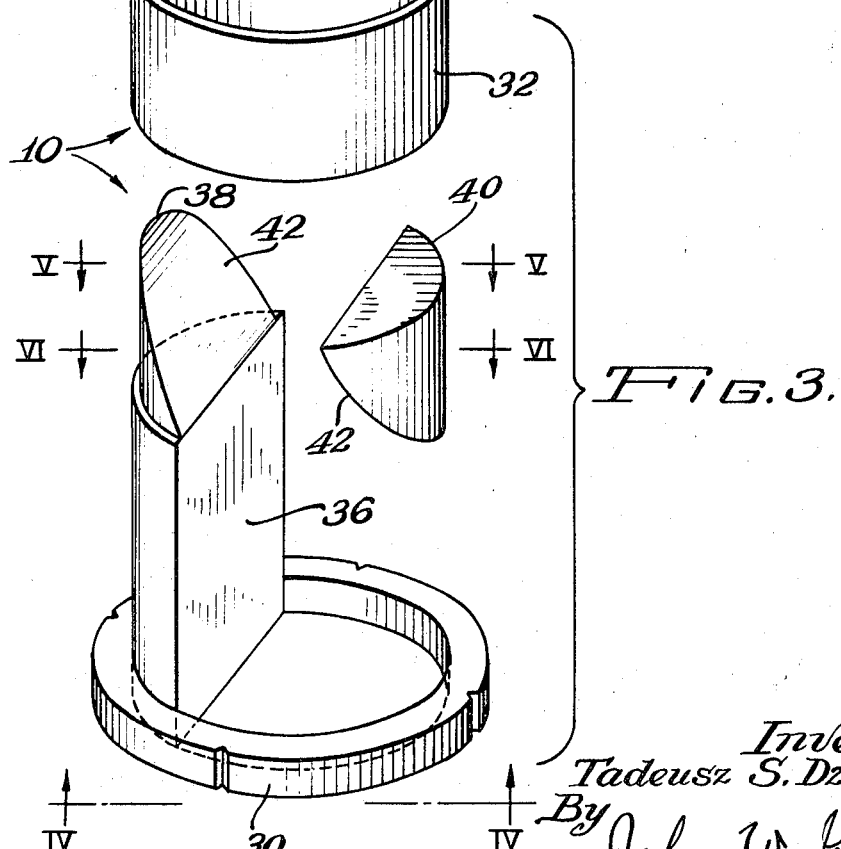

Jan. 21, 1969 T. S. DZIANOTT 3,422,805
ENGINE INLET PASSAGE SWIRL DEVICE
Filed Nov. 16, 1966 Sheet 3 of 3
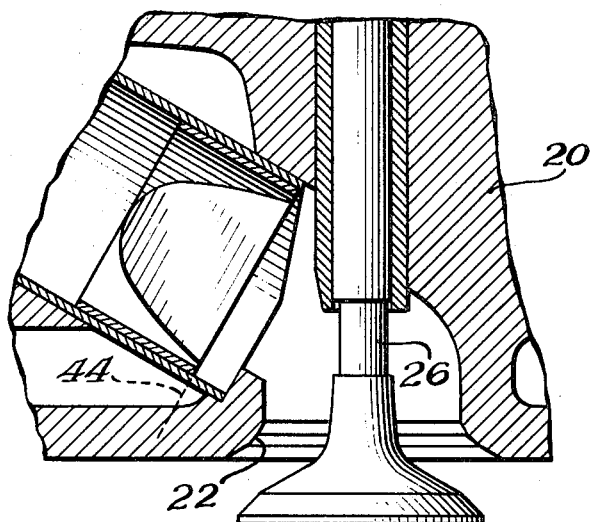
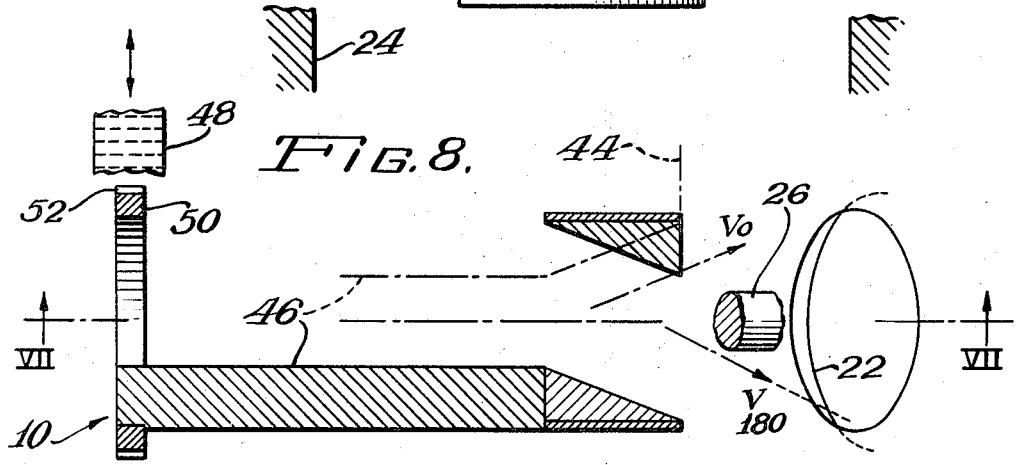
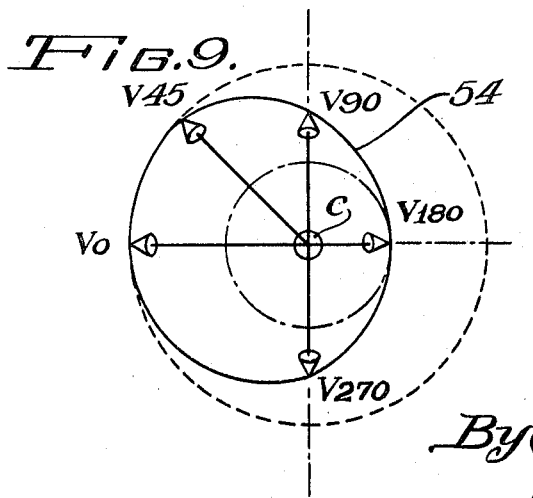
Inventor:
Tadeusz S. Dzianott
By John W. Gaines
Atty.

United States Patent Office 3,422,805
Patented Jan. 21, 1969

---

3,422,805
ENGINE INLET PASSAGE SWIRL DEVICE
Tadeusz S. Dzianott, Hinsdale, Ill., assignor to International Harvester Company, Chicago, Ill., a corporation of Delaware
Filed Nov. 16, 1966, Ser. No. 594,710
U.S. Cl. 123—188        11 Claims
Int. Cl. F01l 3/00; F01l 7/00

ABSTRACT OF THE DISCLOSURE

The structure disclosed herein is an inlet air swirl device which is adjustably positioned in the cylinder head of an internal combustion engine. One such device is provided in each inlet passage anterior to the intake valve therein, and comprises a central body in, and parallel to the axis of, the passage, a centrally-open flange carried at the upstream end of the body for rotating the device to any position from 0° to 360°, and a nozzle in the mouth of the downstream end of the body, which is disposed diagonally to the passage axis and by which the most beneficial airstream direction toward the valve is established.

---

This application relates to means for controlling swirling of the intake air to the cylinder or cylinders of an internal combustion engine. It more particularly relates to a swirl device providing a nozzle effect in the inlet passage to each cylinder, to adjust the induction flow direction for achieving optimum swirl in the cylinder under particular engine operating conditions and configurations.

The optimum swirl condition produces the best engine performance, and it has heretofore been a problem to ascertain the optimum value. It occurs at or between a maximum swirl rate and a minimum swirl rate and is at times, but not necessarily, the maximum swirl rate.

My invention provides a solution to the foregoing problem, as will now be explained.

In the accompanying drawings which show certain preferred embodiments of my invention:

FIGURES 1 and 2 are transverse elevational and top plan views, respectively, of an internal combustion engine embodying the present invention;

FIGURE 3 is an exploded isometric view of a preferred form of the swirl device;

FIGURES 4, 5 and 6 are transverse views of the device taken along the lines IV—IV, V—V, and VI—VI, respectively, in FIGURE 3;

FIGURES 7 and 8 are elevational and plan views in section corresponding generally to FIGURES 1 and 2, but showing a modification of the invention; and FIGURE 9 is a polar coordinate diagram showing the relation of rotational setting of the swirl device and the magnitude of the resulting swirl rate in an engine cylinder.

More particularly in FIGURES 1 and 2, my device 10 constitutes an insert, preferably an insert fitting in a cylinder head inlet passage 12 of an internal combustion engine 14. The passage has a long, straight, thin walled sleeve 16 pressed thereinto, and the passage leads from a passage inlet point within an intake manifold 18 on the head 20, at an acute vertical angle of approximately 60° inwardly into the head 20. By acute angle, I mean broadly the angle to the plane of the cylinder or cylinders, irrespective of whether they are literally vertically disposed or not.

Beginning at a point of minimum port diameter indicated at PD and being of circular cross section at that point, the port enlarges into a horn shaped configuration due to a spherical radius on the passage wall indicated at SR, and then flares into a frustoconical valve seat 22 in the bottom plane of the head 20. The column of flow inducted into an associated cylinder 24 in the engine being charged by the port is controlled by a spring closed intake valve 26 which, when lifted from its seat 22 in timed relation to the engine, affords communication from the passage 12 through the port opening into the cylinder 24. The valve 26 is cyclically timed and cammed by conventional means, the force to overcome the spring being transmitted thereto by a valve bridge or rocker arm 28 as appropriate.

A ring-shaped flange 30 carried at the anterior or outer end of the device 10 enables it to be rotated into any angular setting within a range of 360°. At the posterior or inner end, a band 32 is carried around the mouth of the device. A set screw 34 is carried in a horizontal position in threads in the head 20 for engaging the band 32 and locking the device in the rotational setting desired. The sleeve 16 is slotted to enable the screw 34 to project therethrough.

The device 10, by reason of further structure thereof now to be described, enables the flow column as it blows into the cylinder 24 to discharge in varying directions from the mouth of the device despite the substantially tangential relationship of the inlet passage structure to the cyclinder 24. In other words, both the outer side wall of the passage and the outer side of the circular valve seat 22 are practically tangent to the cylinder 24 at a common point. The centerline of the passage and the central axis of the valve seat 22 either very nearly intersect or actually intersect, forming an included oblique angle of approximately 120° in the latter case.

More particularly in FIGURES 3, 4, 5, and 6, the device 10 includes a long nozzle body 36 in the shape of a seegment of a cylinder, i.e., appearing as the segment of a circle as viewed in cross section, and forming the planar side of a nozzle flow path disposed within the inlet passage 12 eccentrically to the longitudinal axis of the latter. The body 36 and the flange 30 interfit along complementary curving surfaces thereof having equal radii and are welded together so that the two are flush with one another at their corresponding outer ends.

The device 10 at the mouth thereof has a pair of identical solid parts 38 and 40 of generally ungulate shape, i.e., the generally diagonal end portion which would remain if an intersecting diagonal plane were to be passed through a cylindrical segment. The ungulate parts 38 and 40 are in mutually reversed, transversely spaced apart relation. They are connected in that relation to one another by the surrounding band 32 and they are connected to the nozzle body 36 by welding of the end of the latter to each of the part 38 and the band 32.

Each ungulate part presents a major interior plane surface 42 diagonal to the longitudinal axis of the inlet passage and parallel to the other one of the plane surfaces 42. The diagonal angle was an oblique angle of about 154° in one physically constructed embodiment of the invention, and the preferred range is from 145° to 160°, approximately.

In case the nozzle body 46 is made substantially coextensive in length with the major straight portion of the inlet passage as shown in FIGURE 8, the plane 44 of the mouth of the nozzle takes or approaches the closest possible position to the minimum diameter of the port, past which the port immediately flares into the valve seat 22 (FIGURES 7 and 8). The device 10 in that case has a maximum operational action in modifying the effective direction of the flow column.

If a rack 48 is provided which can be moved lengthwise into variously set positions, and if the flange 50 of the device carries a peripheral set of teeth 52 meshing with the rack (FIGURE 8), the device 10 can be rotated either alone, or simultaneously with and at the same phase angle of other devices similarly communicating with individual other cylinders of the engine. The set screw 34 can be omitted.

The body takes one extreme position as shown by the broken lines 46 in FIGURE 8, such position corresponding to the same position shown for the embodiment of preceding FIGURE 2, and takes the solid line position shown by the solid lines 46 in FIGURE 8 when in the diametrically opposite, extreme position within the passage.

In FIGURE 9 and, consistently in the other figures of drawing, the flow vectors illustrated are differentiated according to their angle by subscripts. The vector V0 represents the angular setting in which the nozzle tends to displace the column of flow farthest from the centerline of the engine cylinder 24, and is the zero datum or reference position. Beginning at that position, clockwise rotation of the device as it is viewed in FIGURE 4, and as its polar vector diagram is viewed in FIGURE 9, causes the diagonal discharge angle of the nozzle to rotate progressively through a 45° angle, a 90° angle, and so forth, as indicated by the subscripts V45, V90, and so forth.

At each angle of rotation of the device 10, the comparative magnitude of swirl rate in r.p.m.'s in the cylinder is represented by the distance from the point C in FIGURE 9 to the intersected point on a closed curve 54. The swirl rate in its absolute value actually reduces or increases by the amount that the lift of the valve 26 is reduced or increased, but the relative magnitudes of swirl maintain approximately the same proportions for all amounts of valve lift.

During induction, i.e., when the piston moves downwardly in the cylinder on the suction stroke, the input flow moves longitudinally down the inlet passage so as to offset toward the side opposite from the nozzle body. From the mouth of the nozzle, the flow column blows diagonally so that the core of the column will be offset from the central axis of, and will accordingly hug one side of, the port opening into the cylinder.

In general, maximum swirl occurs when the vectors are in the range from about V0 to V45. Minimum swirl rate most always occurs when the nozzle is rotated into a position such that the discharge angle has the vector V180. In one physically constructed embodiment of the invention when the diagonal discharge angle of the device thereof took the position V180, the swirl was reduced to 4,000 r.p.m. or less, whereas in the position represented by V0 the swirl rate was increased to about 6,000 r.p.m. in the cylinder.

No appreciable change in the flow rate is detected irrespective of the rotational angularity of the device 10, provided the lift of the valve 26 remains constant when the device is in its different angular settings.

The present concept of blowing the column of flow from the diagonally disposed mouth of a nozzle has multiple advantages over structures proposed heretofore such as shrouds carried by the valve or vanes carried inside the port. In brief, flow losses, flow rate variations, non-uniform flow areas, deflections, and vibrations encountered heretofore are materially reduced or substantially eliminated with the present nozzle.

As herein disclosed, my device is shown embodied in a four stroke cycle diesel engine. It is evident that equivalent swirl variations can be created thereby in semi-diesel engines, in modified diesel cycle engines, and in other engines such as Otto cycle and modified Otto cycle engines. It is immaterial that the inflow to the cylinder is premixed by carburetion or premixed by manifold injection, or that mixing takes place in the cylinder by injection directly or through a pre-combustion or pre-cup chamber. Also, the principles hereof equally apply to naturally aspirated and to supercharged engines, the difference being simply whether the flow blowing from the nozzle is induced by vacuum alone on the downstream side or by a combination of pressure and vacuum across the nozzle on the respective upstream and downstream sides thereof.

Variations within the spirit and scope of the invention described are equally comprehended by the foregoing description.

What is claimed is:

1. In an engine in which a juxtaposed block and head thereof define, respectively, a cylinder and an intake port opening into the cylinder, the improvement comprising:
    inlet passage means which for its major portion is substantially straight and is arranged in the head so as to communicate a column of fluid flow through the port opening into the cylinder;
    an insert in the straight major portion of said means comprising a prolongated nozzle body having an anterior end in the inlet of the passage means, and having a posterior end comprising a fluid-flow-discharging nozzle mouth at a point remote to the inlet porviding a diagonal nozzle angle relative to the longitudinal axis of the passage means, whereby the core of the flow column from the nozzle will be offset from the central axis of, and will accordingly hug one side of, the port opening into the cylinder, for modifying swirling of the flow inducted by the latter; and
    means for rotating the prolongated nozzle body to move the nozzle mouth to an angle of setting in the passage means enabling the flow column at the posterior end to discharge at said remote point in a selected diagonal direction from the plane of the mouth of the nozzle.

2. The invention of claim 1, characterized by:
    long, straight, thin walled sleeve means forming that part of the passage means which constitutes its substantially straight major portion aforesaid.

3. The invention of claim 1, further characterized by means for locking the nozzle body at the angular setting into which rotated.

4. The invention of claim 1, the insert characterized by generally ungluate parts carried thereby at the mouth of the nozzle for discharging the flow.

5. The invention of claim 4, each ungulate part characterized by a major interior plane surface presented thereby diagonal to said longitudinal axis and parallel to the plane surface presented by the other part.

6. The invention of claim 5, the diagonal angle between the plane of each surface and said longitudinal axis characterized by an oblique angle of no less than about 150°.

7. The invention of claim 6, the body of said nozzle defining a flow path disposed within said passage means eccentrically to the longitudinal axis thereof.

8. The invention of claim 1, the nozzle body characterized by a solid member which as viewed in cross section constitutes the segment of a circle, and which forms the side of a nozzle flow path disposed within said passage means eccentrically to the longitudinal axis thereof.

9. The invention of claim 8, the insert characterized by ungulate parts defining a mouth for discharging the flow from the nozzle, and having means of connection to the solid member and to one another so as to maintain a gap between the parts defining said nozzle mouth.

10. The invention of claim 9, further characterized by a fixed sleeve in said passage means rotatably receiving the insert.

11. In the cylinder head of a piston engine:
    inlet passage means therein which is disposed at an acute vertical angle and which for its major portion is a straight fluid flow passage conforming to said angle;
    a prolongated nozzle body inserted in said straight major portion of the passage means, co-extensive in length with a major portion thereof, the mouth of said nozzle having a diagonal nozzle angle relative to the longitudinal axis of the passage means for discharging a flow of induction fluid in the plane of the mouth of the nozzle, but generally diagonally to the plane of discharge; and means for rotating said nozzle into an angular setting as desired.

References Cited

UNITED STATES PATENTS 2,066,228 12/1936 Ricardo.
2,920,613 1/1960 Vogel et al.
3,035,558 5/1962 Wiebicke et al.
3,154,059 10/1964 Witzky et al.

FOREIGN PATENTS 535,065 3/1941 Great Britain.
882,706 11/1961 Great Britain.

AL LAWRENCE SMITH, *Primary Examiner.*

U.S. Cl. X.R.

123—193